United States Patent [19]
Shute

[11] Patent Number: 6,092,818
[45] Date of Patent: Jul. 25, 2000

[54] HOOD ASSEMBLY

[75] Inventor: Malcolm Shute, Beauvais, France

[73] Assignee: AGCO SA, France

[21] Appl. No.: 09/290,805

[22] Filed: Apr. 13, 1999

[30] Foreign Application Priority Data

Apr. 14, 1998 [GB] United Kingdom ............... 9807728

[51] Int. Cl.[7] ............................................. B62D 25/10
[52] U.S. Cl. ................................ 280/69.21; 280/69.24
[58] Field of Search ............................. 180/69.2, 69.21, 180/69.22, 69.24; 296/76

[56] References Cited

U.S. PATENT DOCUMENTS

| 1,459,370 | 6/1923 | Holmes | 180/69.2 |
| 2,086,172 | 7/1937 | Northup | 180/69.2 |
| 2,135,613 | 11/1938 | Orlow | 180/69.2 |
| 3,743,045 | 7/1973 | Hansen | 180/69.24 |
| 3,982,600 | 9/1976 | Gerresheim et al. | 180/69.21 |
| 4,530,412 | 7/1985 | Sigety, Jr. | 296/76 |
| 5,782,312 | 7/1998 | Murakawa | 180/69.24 |

FOREIGN PATENT DOCUMENTS 45204  4/1952  United Kingdom ............. 1680 69.24

*Primary Examiner*—Richard M. Camby
*Attorney, Agent, or Firm*—MacMillan, Sobanski & Todd, LLC

[57] ABSTRACT

In a hood assembly 1 for a vehicle, the assembly 1 comprises a substantially planar top panel 4 and side panels 2 depending from the region of respective opposite side edges of the top panel 4, the assembly further comprising hinge means 11 for pivoting the top and side panels together with respect to some mounting point on the vehicle about a main axis 10 substantially in the plane of the top panel, the side panels being hingedly mounted with respect to the top panel such that a degree of pivotal movement of each side panel 2 with respect to the top panel 4 is possible about a respective secondary axis 16 substantially perpendicular to the main axis 10.

11 Claims, 5 Drawing Sheets

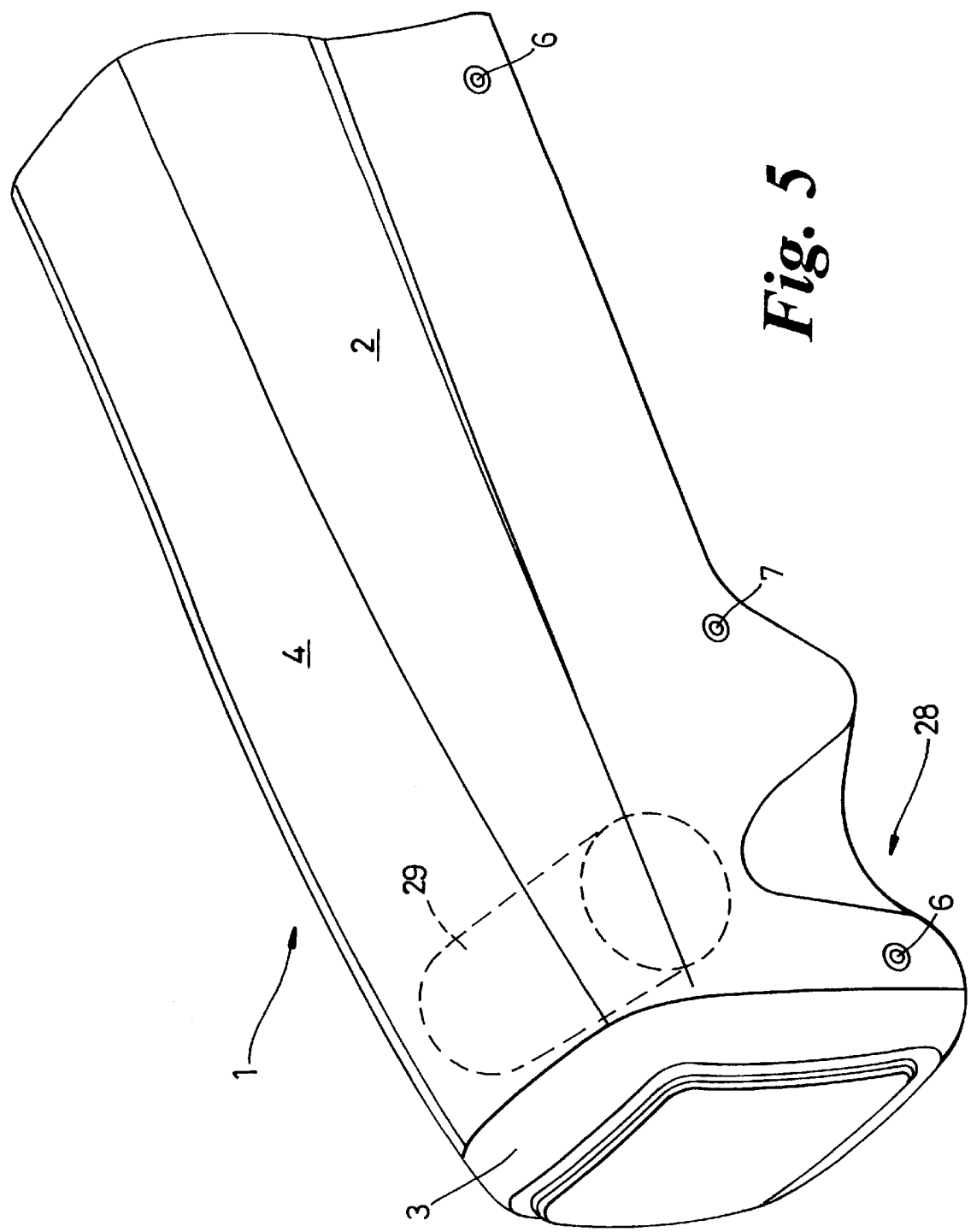

HOOD ASSEMBLY

BACKGROUND OF THE INVENTION

The present invention relates to hood assemblies comprising top and side panels for use eg for enclosing the engine of a vehicle, eg a utility vehicle such as an agricultural tractor or an industrial vehicle such as a backhoe loader.

It is known for the engine hoods of agricultural tractors to be hinged at the rear, normally in the region of the rear of the top panel, so that the hood can be simply lifted in one piece to provide easy access to the engine and associated components.

A problem with this sort of system arises when the side panels of the hood taper inwardly towards the bottom. In this case it is possible for the engine or other components normally enclosed within the hood to prevent the hood assembly being raised unless the side panels or portions of them are first removed.

SUMMARY OF THE INVENTION

According to the present invention a hood assembly, for example for use as the engine hood of an agricultural tractor, is provided having the features set out in claim 1 hereto. The ability to pivot the side panels means that the whole hood assembly can be raised without removing the side panels, once the side panels have been pivoted outwardly sufficiently to avoid any obstruction by engine or other components which would be enclosed by the hood assembly in its closed position.

Preferable features of the invention are set out in the dependent claims. The advantages of these and other preferable features will be apparent from the following description of two specific embodiments which is given by way of example only with reference to the accompanying drawings.

BRIEF DESCRIPTION OF THE DRAWINGS

FIG. 5 is a perspective view of a second embodiment of hood assembly in accordance with the invention.

DETAILED DESCRIPTION OF THE PREFERRED EMBODIMENT

Figure 1:
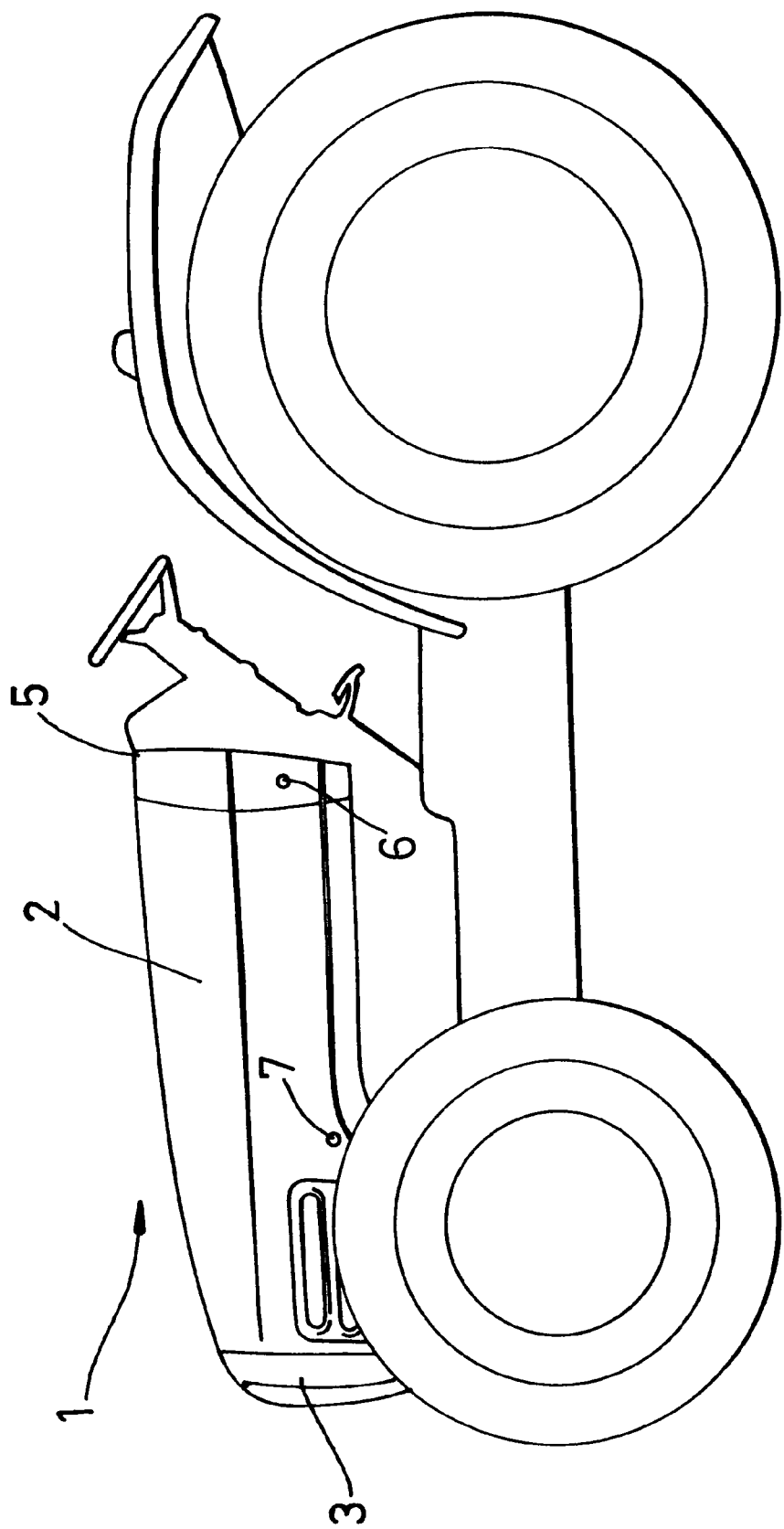
FIG. 1 is a side view of an agricultural tractor fitted with a hood assembly in accordance with the invention.

Referring firstly to FIG. 1, an agricultural tractor has an engine hood shown generally at 1, comprising side panels 2, a top panel 4 (see FIG. 2) and a front or grille panel 3. The assembly comprising side panels 2 and top panel 4 is pivotally mounted to the main body of the tractor at 5. The grille panel 3 is mounted directly to the body of the tractor and does not pivot with the side/top panel assembly, although in a modification of this embodiment the grille panel could form part of the pivoting assembly.

The side panels 2 are fastened to the main body of the tractor at releasable fastening points 6 at the front (see FIG. 2) and rear. A similar releasable fastening point 7 is located approximately half way along the hood and secures the respective side panel 2 to a pivoting frame 8 (see FIG. 3).

Figure 3:
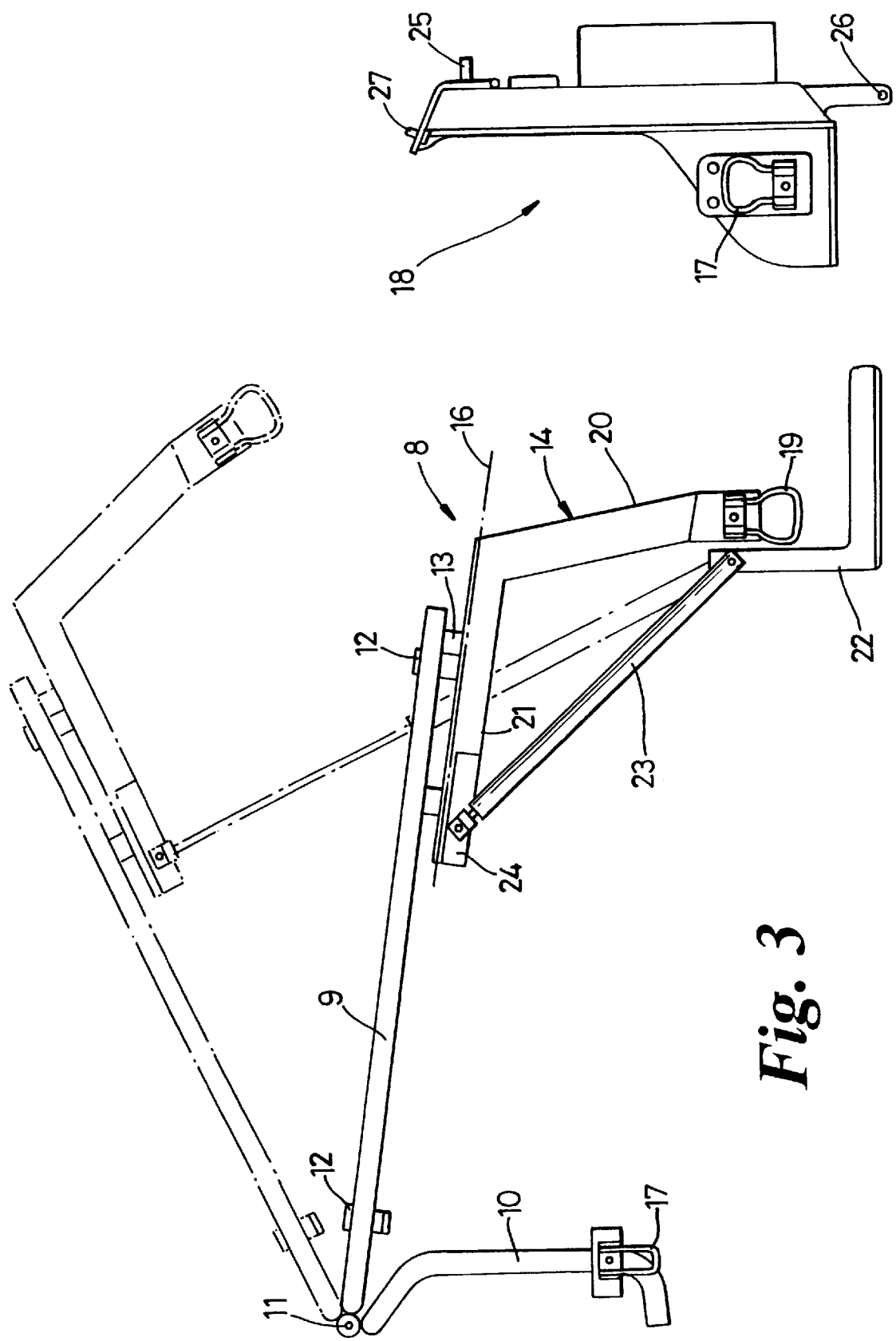
FIG. 3 is a side view of a supporting frame of a hood assembly in accordance with the invention, together with various mountings for the hood.
Figure 4:
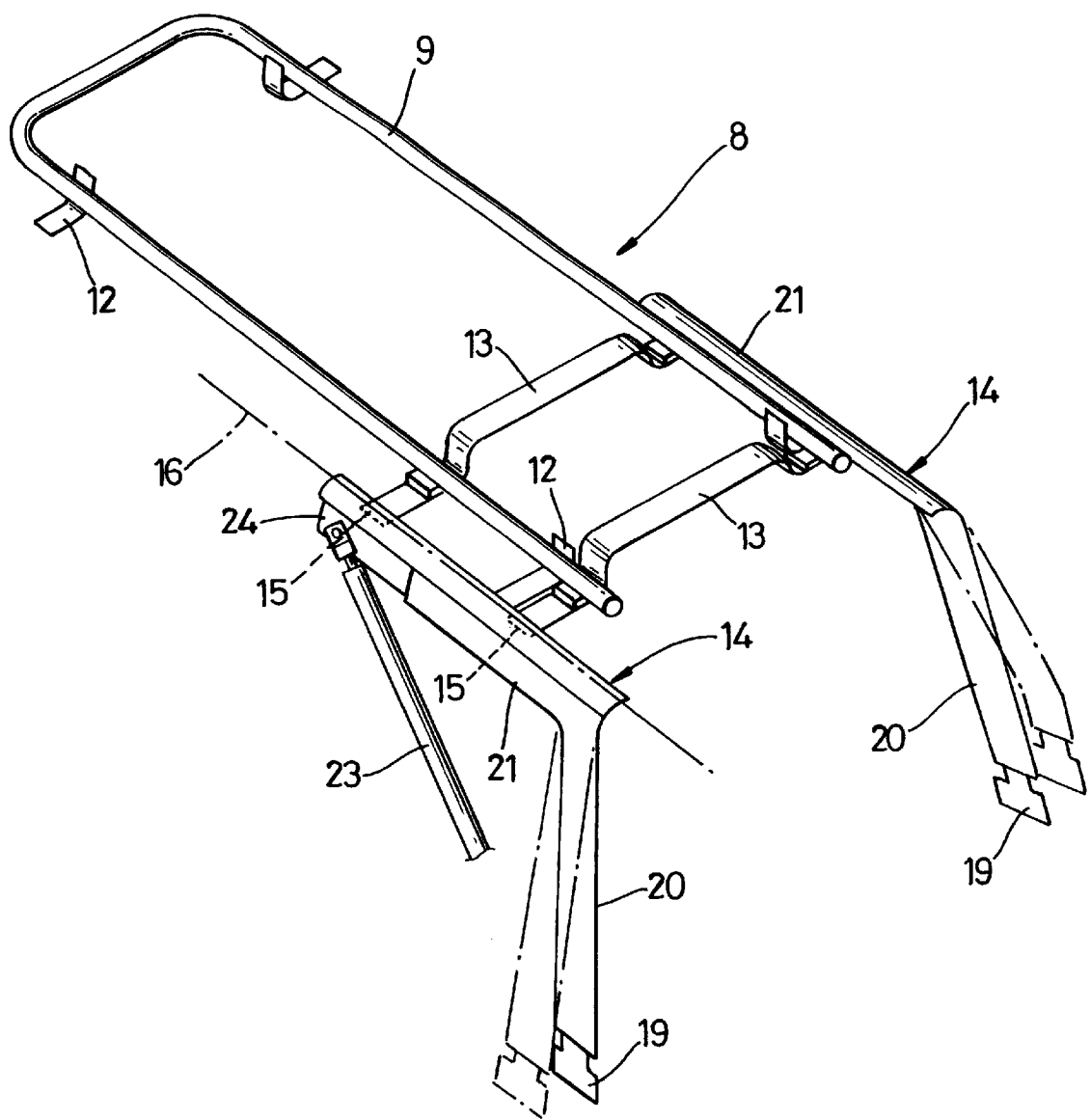
FIG. 4 is a perspective view of the supporting frame of FIG. 3.

Referring now to FIGS. 3 and 4, the frame 8 comprises a generally "U" shaped member 9 on which the top panel 4 is mounted. The "U" member 9 is pivotally mounted to a rear bracket 10 so as to be pivotable about an axis 11. The bracket 10 is mounted on the tractor chassis (not shown). The side panels 2 are detachably mounted to the top panel 4 along their upper edges, and also supported by lugs 12 fastened to the "U" member 9, in such a way as to allow a certain amount of free play. Cross members 13 extend across the "U" member 9 and are fastened to it. On the ends of these cross members side panel support members 14 are mounted via hinges 15 allowing the supports 14 a degree of pivoting movement about an axis 16 approximately parallel with the legs of the "U" member 9.

Mounted on the front of the tractor chassis is a front grille mounting 18 (FIG. 3). The front grille panel 3 (not shown in FIGS. 3 and 4) is releasably mounted at a releasable fastening point 25 at the top of the mounting 18, and pivotally mounted on it at a hinge 26 at the bottom of the front mounting 18. The top panel engages a locating pin 27 at the top of the front mounting 18. When the hood is assembled, the edges of the side, top and front panels interact to form a seal, in a manner known in the art and not relevant to this invention.

Located on the front grille mounting 18 and on the rear bracket 10 are fastening brackets 17 with which catches (not shown) on the side panel at the front and rear fastening points 6 releasably engage to secure each side panel with respect to the tractor chassis. A similar fastening bracket 19 is located at the end of a depending arm 20 of each side panel support 14, to secure each side panel to the respective support 14.

An upper horizontal angle section portion 21 of each side panel support 14 is mounted via hinges 15 to the ends of cross members 13 such that the one leg of the angle section extends inwardly and the other downwardly. The hinges 15 are located towards the edge of the inwardly extending leg of the portion 15. A gas strut 22 of known design extends between a further bracket 23 mounted on the tractor chassis and the angle section portion 21 of the support 14. The gas strut 22 is mounted in a slightly recessed region 24 of the downwardly extending leg of the angle portion 21.

If access is desired to the components (not shown) enclosed by the hood assembly, the top fastening point 25 of the front panel is first released and the front panel 3 hinged down. This is necessary to enable the side panels to be moved because of the sealing interaction of the edges of the front and side panels. The front and rear fastenings 6 are then released. The gas struts 23 are, as is conventional, arranged to provide an upward biasing force slightly less than that necessary to lift the hood on the hinged frame 8, and the operator needs to apply a small force upwardly on the hood to initially raise it. Once raised a little the gas strut moment increases and fully supports the hood. The force of the gas struts is sufficient, however, to provide a moment about the axis 16 to pivot the supports 14 and side panels 2 with respect to the top panel 4. The side panels are of course still fastened to the supports 14 at fastening points 7. The arrangement of the hinges 15 is such that a limited movement only is permitted, sufficient to ensure that no components are snagged when the hood assembly is raised about the main axis 11.

Figure 2:
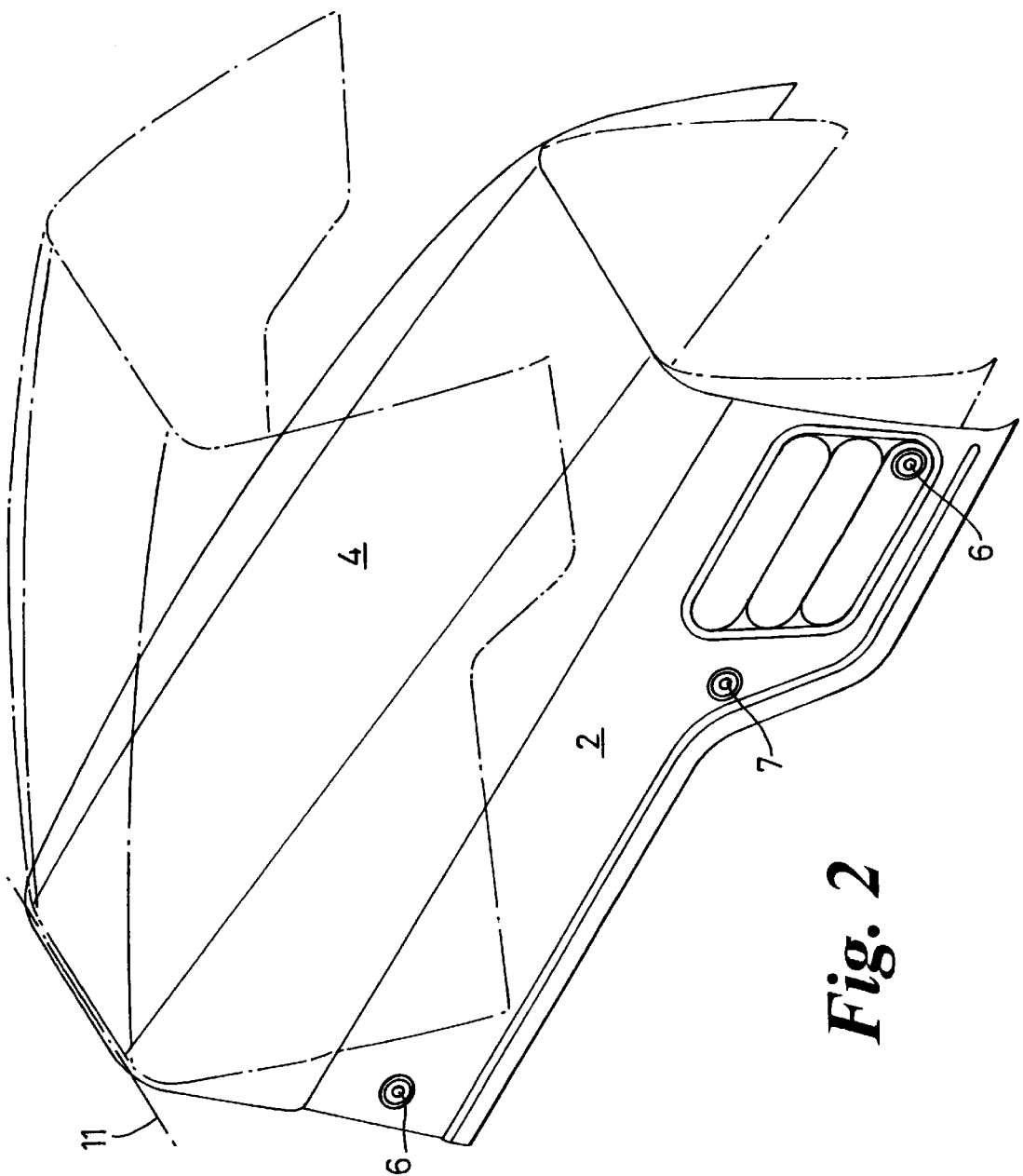
FIG. 2 is a perspective view of the top and side panels of a hood assembly according to the invention.

As may be seen in FIG. 2, the lower edges of the side panels are curved inwardly and, if they were not swung outwardly as described above, would snag components under the hood.

Each side panel 2 can also be removed by releasing the fastening at the fastening point 7 and lifting the panel to release it from the top panel from which it simply hangs.

As mentioned above, in a modification of this embodiment, the front grille panel 3 could be secured to the top and side panels and releasably secured to the chassis via some other arrangement of front mounting such that the panel could be pivoted upwardly together with the top and side panels, having first released fastenings to the front mounting and to the side panels.

In another modification, springs could be provided to bias the side panels upwardly about the axis 16, or the supports 14 could be rigidly fastened to the cross members 13 and the resilience of depending arms 20 used to provide the necessary lifting force.

It is also possible that the side panels and top panel could be constructed from a single piece of sheet metal whose flexibility permits the flaring of the side portions.

Referring now to FIG. 5, a second embodiment of hood assembly is shown. Similar parts are referred to using the same numerals as for the first embodiment shown in FIGS. 1 to 4, and the second embodiment is identical to the first in substantially all respects other than the shape of the side panels 2. In this embodiment, the side panels are not simply curved inwardly at the bottom, but also each have a recessed region 28 in the lower half, near the front. The purpose of the recessed region 28 in each panel 2 is to accommodate the edge of the respective front wheel of the tractor when the wheels are turned through a large steering angle; in this way the maximum steering angle of the tractor is increased. It will be readily seen that when the hood is raised the recessed region 28 may interfere with components, such as a filter 29, stored under the hood but above the recessed region 28 and extending over it. The flaring of the side panels with respect to the top panel 4 in accordance with the invention avoids this problem.

What is claimed is:

1. A hood assembly for a vehicle, the assembly comprising a substantially planar top panel and side panels depending from the region of respective opposite side edges of the top panel, the assembly further comprising hinge means for pivoting the top and side panels together with respect to some mounting point on the vehicle about a main axis substantially in the plane of the top panel, the side panels being hingedly mounted with respect to the top panel such that a degree of pivotal movement of each side panel with respect to the top panel is possible about a respective secondary axis substantially perpendicular to the main axis.

2. A hood assembly as claimed in claim 1 further comprising biasing means for applying a biasing force tending to pivot the side panels with respect to the top panel.

3. A hood assembly as claimed in claim 2 wherein the said biasing means comprises means for applying a biasing force to the assembly tending to pivot the assembly about the main axis with respect to the vehicle.

4. A hood assembly as claimed in claim 2 wherein the said biasing means comprises a gas strut.

5. A hood assembly as claimed in claim 2 wherein the said biasing means comprises a resilient member or members.

6. A hood assembly as claimed in claim 1 wherein each of the side panels is generally planar but includes a region which extends out of the general plane of the panel towards the other of the side panels.

7. A hood assembly as claimed in claim 1 further including a front panel extending between an edge of each of the said side panels and top panel and wherein the said side and/or front panels are detachably mounted with respect to the top panel.

8. A vehicle including a hood assembly as claimed in claim 1.

9. A vehicle as claimed in claim 8 including components enclosed by the said assembly in a closed position thereof in which the side panels are in a predetermined spatial relationship with respect to the top panel, which components would obstruct movement of the assembly about the said main axis if the side panels were not first moved with respect to the top panel out of the said predetermined spatial relationship.

10. A vehicle as claimed in claim 8 wherein the said regions constitute recesses in the side panels into which the vehicle front wheels extend at a given steering angle.

11. A hood assembly as claimed in claim 6 wherein the said regions constitute recesses in the side panels into which vehicle front wheels can extend at a given angle.

* * * * *